Nov. 9, 1954     O. PONTIUS     2,693,804
SYRINGE CASING FOR CYLINDRICAL AMPOULES
Filed April 23, 1953     2 Sheets-Sheet 1
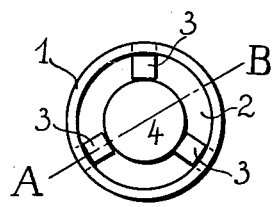
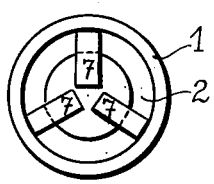
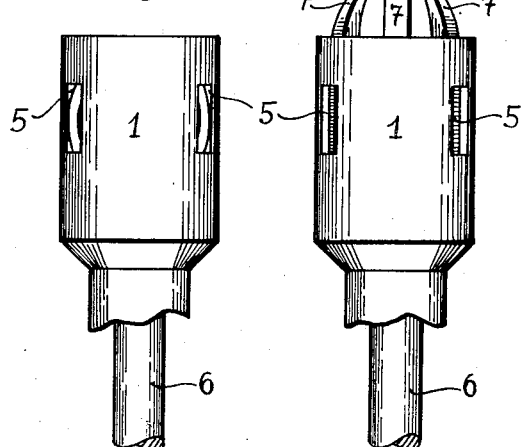
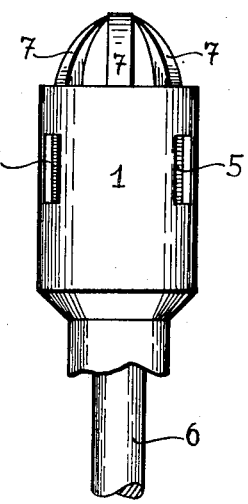
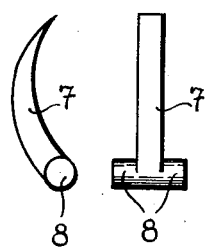
INVENTOR.
ATTORNEYS Nov. 9, 1954  O. PONTIUS  2,693,804
SYRINGE CASING FOR CYLINDRICAL AMPOULES
Filed April 23, 1953  2 Sheets-Sheet 2

Oswald Pontius
INVENTOR.

BY Richardson, David and Nordon
ATTORNEYS

United States Patent Office 2,693,804
Patented Nov. 9, 1954

2,693,804

SYRINGE CASING FOR CYLINDRICAL AMPOULES

Oswald Pontius, Frankfurt am Main, Germany, assignor to Farbwerke Hoechst Aktiengesellschaft vormals Meister Lucius & Brüning, Frankfurt am Main, Germany Application April 23, 1953, Serial No. 350,623

Claims priority, application Germany May 6, 1952

7 Claims. (Cl. 128—218)

The commercial syringe casings for cylindrical ampoules still have the great drawback that it is not possible to retract the piston stopper, that is to say, to effect a suction or aspiration.

Many attempts have already been made to overcome said drawback. The oldest method still applied to a small extent operates as follows: a metal cylinder provided with a thread is vulcanised into the interior of a piston stopper and the plunger head in the syringe casing is correspondingly provided with a threaded bolt, or vice versa, so that the piston stopper may be tightly connected with the plunger.

Apart from the fact that this expedient complicates and increases the manufacturing costs of piston stoppers and becomes thus unbearable for cheap preparations, this construction has the inconvenience that the screw in the piston stopper which, especially after long storage, sticks to the surrounding wall, can be tightly screwed in, but cannot be unscrewed again from stoppers after they have been loosened by pushing forward and backward; they easily turn around themselves and the removal of emptied cylindrical ampoules is thus very much impeded.

In other constructions the plunger head is provided with a cork-screw but the same drawbacks as regards the removal of the emptied ampoule occur. Other constructions are so complicated that they cannot be applied in practice owing to the high costs of manufacture.

By means of a syringe casing for cylindrical ampoules in accordance with the present invention the drawbacks pertaining to former devices are overcome as follows:

A hollow plunger head is provided with two or more claw-like little hooks which may be moved forward or backward by means of a push rod having an especially shaped front piece. When these claw-like hooks are moved forward, their tips meet above the centre of the plunger head.

An example of the syringe casing for cylindrical ampoules constructed in accordance with the invention with three claws is shown in the accompanying drawings.

Fig. 1 shows the plunger head in axial direction with the claws retracted.

Fig. 2 is a side view of the plunger head.

Fig. 3 is an axial view of the plunger head.

Fig. 4 is a side view of Fig. 3.

Figs. 5 and 6 are two views of one of the claws.

Figure 8:
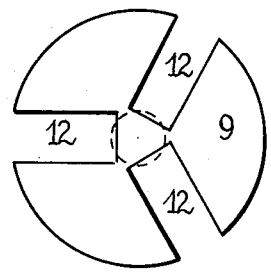
Fig. 8 is a plan view of the top disk.

In the hollow plunger head 1 is mounted the end of the connecting rod 6 which consists of two circular disks or upper and lower decks 9 and 10, respectively. The space between these disks depends on the size of the pivots 8 (see Fig. 6). The top disk 9 is provided with radial apertures 12 as illustrated in a top view in Fig. 8. The closing plate or cover 2 which is provided with radial apertures 3 destined for the hooks to pass through, carries next to these apertures a mandrel 11 pointed to the inside. The drawn contours (outlines) 7, 9 and 10 illustrate the position of these members when the claw or hook is out, and the contours given in broken lines $7^1$, $9^1$ and $10^1$ illustrate the respective positions when the claw or hook is retracted. It is evident from the drawing that mandrel or conical cam 11 serves to guide the hook and to keep it rigid in its final position. The slot or longitudinal slit 5 is required to receive the retracted claw or hook in the narrow plunger head, said slit corresponding with apertures 3 and 12, respectively. Plate 9 and pivots or pins 8 serve for the retraction of the hooks or claws 7. The recess 4 in the top plate or cover 2, which cover seats on the top of the plunger 1, serves to offer to the rubber of the piston stopper displaced by the claws, a possibility to deflect, so that the pressure of the rubber against the walls of the cylinder is not unduly increased.

From a technical point of view it would be possible to cause the claws to act from the centre towards the periphery instead as described above, but this would not involve any advantages; on the contrary, difficulties and an increased risk of breakage of the hooks when inappropriately treated, would arise. In order to enable the claws to be driven into the tough rubber of the piston stopper, the plunger head has to be pressed firmly on to said piston stopper.

According to the technique hitherto applied, cylindrical ampoules were placed into the syringe casing provided with the double-ended injection needle; if applied to the present case, when pressure is applied to the piston stopper, the injection solution would already flow out before the claws or hooks would penetrate into the rubber. The injection needle must, therefore, be pierced through the front rubber stopper of the cylindrical ampoule after securing a firm hold of the piston stopper by means of the claws or hooks according to the present invention as described above. It is true that with the hitherto applied syringe-casings it is possible to insert the injection needle after the introduction of the cylindrical ampoule, this procedure is, however, complicated and not satisfactory from the hygienic point of view. With the known constructions it is almost impossible to introduce the injection needle in such a way, that it would not touch the wall of the boring in the top part of the casing through which it has to slide; hence it would be necessary to sterilize the syringe casing before each injection.

This drawback can be overcome as follows: between the cap screw by which the injection needle is held fast and the syringe casing, a small member is intercalated which can be sterilized together with the cap screw and the injection needle.

Figure 7:
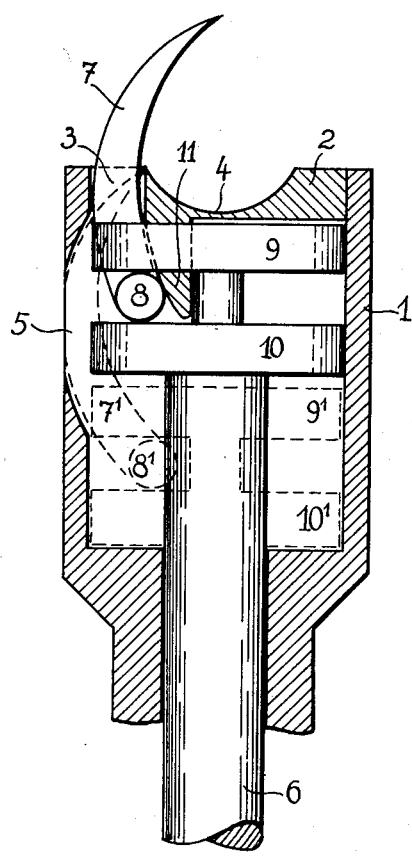
Fig. 7 is an enlarged section on line A—B of Fig. 1, showing the operation of the device.
Figure 9:
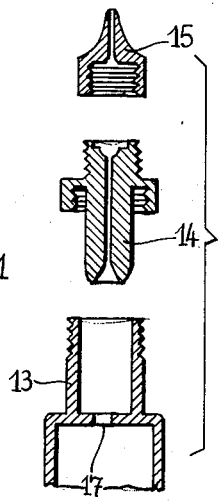
Fig. 9 is an exploded view of the syringe casing and its closure.

Fig. 9 shows separately the top part or neck of the syringe casing 13, the intercalated or cylindrical member 14 and the cap screw 15 by which the injection needle is held fast. As shown, the cap screw 15 is provided with a central bore ending in a hollow.

Figure 10:
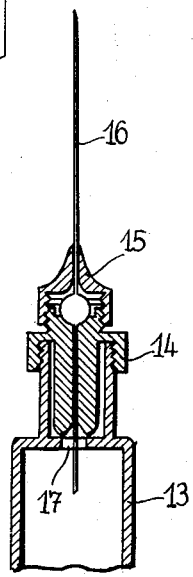
Fig. 10 shows an assembly of the parts of Fig. 9 with the inclusion of a syringe needle.

Fig. 10 shows the afore-named parts screwed together and provided with an ordinary injection needle 16.

The size of the intercalated member is such that, even if it is handled in a less skilful manner, there is no risk that, on inserting it provided with the injection needle, the latter can touch the walls of the top piece 13 of the syringe casing. Even before the tip of the injection needle has reached the aperture 17 in the syringe casing 13, the lower part of the intercalated member 14 and the injection needle held therein are centrally guided by the hollow top part of the syringe casing 13 through the aperture 17. The intercalated member can be screwed onto 13, as illustrated in Figs. 9 and 10, or it may be fastened by a bayonet fixing. Thus it is possible, to first operate the claw-like hooks and then to safely screw on the members holding the injection needle and to pierce the front rubber stopper of the cylinder ampoule.

Since 14 and 15 are simple profile turned pieces and can be manufactured with small costs, the doctor can procure a sufficient quantity thereof so as always to have at hand a sufficient number of sterile injection needles.

A suitable device for operating the connecting rod 6 does not constitute any difficulties from a technical point of view and it is the same with the other not discussed members of the syringe casing.

I claim:

1. In a syringe casing adapted to inclose a cylindrical ampoule of the type wherein a movable stopper of resilient material is provided, said stopper being capable of movement along the cylindrical wall of said ampoule and, by said movement, serving to expel liquid from said syringe, the combination which comprises: a tubular plunger formed with a plunger head wherein a plurality of claw-like hooks for engaging and retracting said movable stopper are provided, said claw-like hooks being housed within said plunger head and wherein an operation rod is provided within said tubular plunger for thrusting said claw-like hooks frontally from said plunger head to stopper-engaging position; said claw-like hooks being provided at their inner end with lateral pivots placed between two disks forming the head of said operating rod; the upper one of said disks being provided with apertures for said claw-like hooks to engage said stopper, or to be retracted when they are to be disengaged from said stopper; the top of said plunger head being closed by a plate provided with openings for said claw-like hooks corresponding to said apertures in said upper disk; said openings centering around a recess and mandrels conically pointing to the interior of said plunger head; said syringe casing being provided with a cylindrical longitudinal top part, a cap screw and an intercalated member between said top part and the cap screw, said intercalated member being provided with a boring to receive the injection needle and being capable of being screwed onto said cylindrical top part of said syringe casing.

2. A plunger for a syringe comprising a tubular plunger head, supporting means located within the plunger head, a plurality of claw-like hooks supported at their lower ends by said supporting means, and means for advancing and retracting said supporting means, whereby the hooks are extended and retracted beyond the open end of the tubular plunger head.

3. A plunger for a syringe comprising a tubular plunger head having a plurality of longitudinal slits, a cover seated on the top of the plunger head and having openings corresponding to the longitudinal slits, supporting means located within the plunger head, a plurality of claw-like hooks supported at their lower ends by said supporting means and each partially seated in one of said longitudinal slits, and means for advancing and retracting said supporting means, whereby the hooks can be consecutively dislodged from their seats in the longitudinal slits, extended through the openings in the cover for the plunger head, retracted through said openings, and re-seated.

4. A plunger for a syringe comprising a tubular plunger head having a plurality of longitudinal slits, a cover seated on the top of the plunger head and having openings corresponding to the longitudinal slits, supporting means located within the plunger head, a plurality of claw-like hooks supported at their lower ends by said supporting means and each partially seated in one of said longitudinal slits, and an operating rod engaging said supporting means and protruding through the bottom of the plunger head, said operating rod being capable of movement along the axis of the plunger head, whereby by upward movement of the operating rod the hooks are unseated and extended through the openings in the cover for the plunger head and, whereby by subsequent downward movement of the operating rod the hooks are retracted through said openings and re-seated.

5. A plunger for a syringe comprising a tubular plunger head having a plurality of longitudinal slits, a cover seated on the top of the plunger head and having openings corresponding to the longitudinal slits, an operating rod extending into the plunger head through its bottom and capable of movement along the axis of the plunger head, said operating rod having at its top an upper and a lower deck, said upper deck having a plurality of openings corresponding to the longitudinal slits, and a plurality of claw-like hooks locked at their lower ends between the decks of the operating rod and projecting upwardly through the openings of the upper deck, each hook being partially seated in a longitudinal slit, whereby by upward and downward movement of the operating rod the hooks are unseated, extended through the openings in the cover for the plunger head, retracted through the openings and re-seated.

6. A cylindrical plunger for a syringe comprising a tubular plunger head having a plurality of longitudinal slits, a cover seated on the top of the plunger head, said cover comprising a centrally recessed plate provided with conical cam means pointing to the interior of the plunger head and having radial apertures corresponding to the longitudinal slits of the plunger head, an operating rod extending into the plunger head through its bottom and capable of movement along the axis of the plunger head, said operating rod having at its top an upper and a lower deck, said upper deck having radial apertures corresponding to the radial apertures of the cover for the plunger head, a plurality of claw-like hooks each partially seated in a longitudinal slit, and a plurality of pins connected transversely to each hook at its base, said pins lying between the decks of the operating rod thereby retaining the hooks pointed upwardly in positive engagement with the operating rod, whereby the claw-like hooks may be consecutively unseated, advanced, retracted, and re-seated by upward and downward movement of the operating rod.

7. A syringe comprising a cylindrical body having a neck at its top, a closure for said top, and a plunger for the bottom, said closure for the top comprising a cylindrical member extending into the neck of the syringe and adapted to engage the top of the syringe, said cylindrical member having a central bore of lesser diameter than the neck of the syringe, and a cap operatively engaging the top of said cylindrical member, said cap having a small central bore ending in a hollow, and said plunger comprising a tubular plunger head having a plurality of longitudinal slits, a cover seated on the top of the plunger head, said cover comprising a centrally recessed plate provided with conical cam means pointing to the interior of the plunger head and having radial apertures corresponding to the longitudinal slits of the plunger head, an operating rod extending into the plunger head through its bottom and capable of movement along the axis of the plunger head, said operating rod having at its top an upper and a lower deck, said upper deck having radial apertures corresponding to the radial apertures of the cover for the plunger head, a plurality of claw-like hooks each partially seated in a longitudinal slit, and a plurality of pins connected transversely to each hook at its base, said pins lying between the decks of the operating rod thereby retaining the hooks pointed upwardly in positive engagement with the operating rod.

References Cited in the file of this patent

UNITED STATES PATENTS

| Number | Name | Date |
| --- | --- | --- |
| 1,217,630 | Powers | Feb. 27, 1917 |
| 2,643,654 | Aberg | June 30, 1953 |
| 2,660,168 | Pontius | Nov. 24, 1953 |